(12) United States Patent
Takahashi et al.

(10) Patent No.: US 9,149,790 B2
(45) Date of Patent: Oct. 6, 2015

(54) POROUS BODY AND PRODUCTION METHOD THEREFOR

(75) Inventors: Hiroshi Takahashi, Otsu (JP); Sadayuki Kobayashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 273 days.

(21) Appl. No.: 13/825,204

(22) PCT Filed: Sep. 22, 2011

(86) PCT No.: PCT/JP2011/071546
§ 371 (c)(1),
(2), (4) Date: Mar. 20, 2013

(87) PCT Pub. No.: WO2012/039446
PCT Pub. Date: Mar. 29, 2012

(65) Prior Publication Data
US 2013/0184145 A1    Jul. 18, 2013

(30) Foreign Application Priority Data

Sep. 29, 2010   (JP) ................................. 2010-218841
Dec. 27, 2010   (JP) ................................. 2010-289708

(51) Int. Cl.
*B01J 20/28*   (2006.01)
*C08L 61/06*   (2006.01)
(Continued)

(52) U.S. Cl.
CPC ............ *B01J 20/28078* (2013.01); *B01J 20/30* (2013.01); *B01J 20/3085* (2013.01); *C08L 61/06* (2013.01); *C08L 23/04* (2013.01); *C08L 23/10* (2013.01)

(58) Field of Classification Search
CPC .. B01J 20/28078; B01J 20/3085; B01J 20/30; C08L 61/06; C08L 23/04; C08L 23/10

USPC .............................................................. 502/4
See application file for complete search history.

(56) References Cited

U.S. PATENT DOCUMENTS 4,834,882 A * 5/1989 Kataoka et al. ............ 210/321.6
4,869,857 A * 9/1989 Itoh et al. ......................... 264/41

FOREIGN PATENT DOCUMENTS

EP    0247596 A2    12/1987
JP    S49-37879 A    4/1974
(Continued)

OTHER PUBLICATIONS

International Search Report dated Oct. 25, 2011, application No. PCT/JP2011/071546.
(Continued)

*Primary Examiner* — Colleen Dunn
*Assistant Examiner* — Haytham Soliman
(74) *Attorney, Agent, or Firm* — Ratnerprestia

(57) ABSTRACT

The present invention provides a porous material which has continuous pores and comprises a polymethyl methacrylate as a main component, wherein the continuous pores have a diameter of 0.001 μm to 500 μm and at least one surface of the porous material has a porosity of 10% to 80%; a separation membrane composed of the same; an adsorbent composed of the same; and a method production of the same. A porous material whose surface porosity and pore diameter are each controlled in a specific range can be obtained. The porous material has a fine and uniform porous structure in which the pore diameter can be controlled in the order of nanometers to micrometers; therefore, it can be advantageously used as a separation membrane such as a blood component separation membrane of an artificial kidney or the like or as an adsorbent.

11 Claims, 5 Drawing Sheets

(51) Int. Cl.
  *B01J 20/30* (2006.01)
  *C08L 23/04* (2006.01)
  *C08L 23/10* (2006.01)

(56) References Cited

FOREIGN PATENT DOCUMENTS

| JP | 58-163490 A | 9/1983 |
|---|---|---|
| JP | 63-248405 A | 10/1988 |
| JP | 2002-194131 A | 7/2002 |
| JP | 2003-064214 A | 3/2003 |
| JP | 2006-257275 A | 9/2006 |
| JP | 2008-056869 A | 3/2008 |
| JP | 2010-222566 A | 10/2010 |
| WO | WO 2009-061759 A1 | 5/2009 |

OTHER PUBLICATIONS

E.L. Feitsma., A.de Boer., G. Challa, 1975, Polymer vol. 16, pp. 515-519.
European Search Report of Corresponding EP Patent Application No. 11828904, Issued May 30, 2014.

\* cited by examiner

[Figure 1]
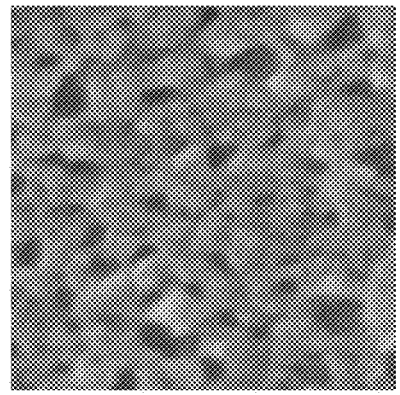
[Figure 2]
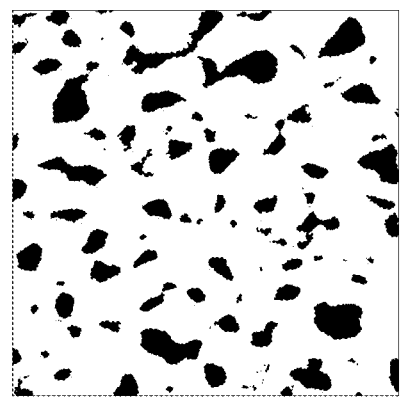
[Figure 3]
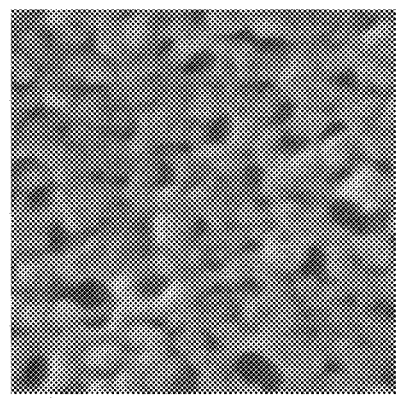

[Figure 4]
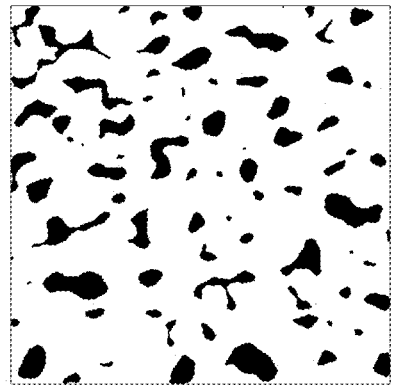
[Figure 5]
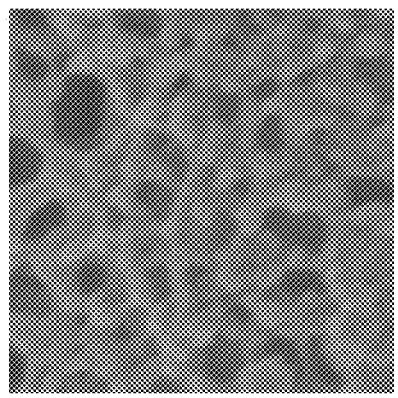
[Figure 6]
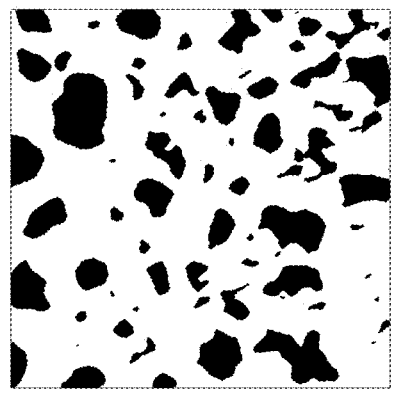

[Figure 7]
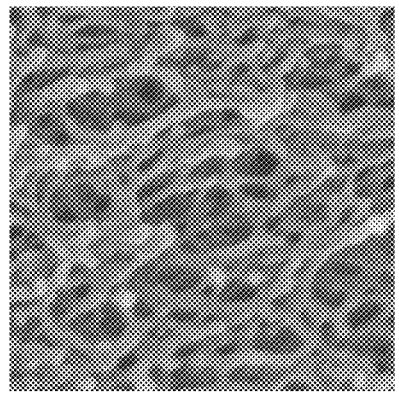
[Figure 8]
[Figure 9]
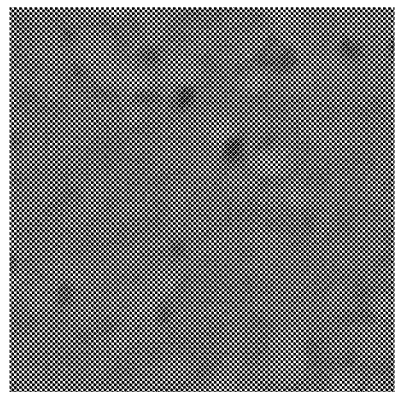

[Figure 10]
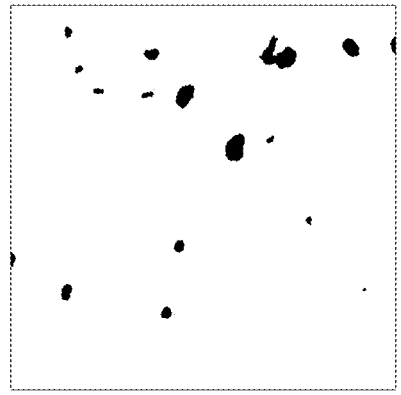
[Figure 11]
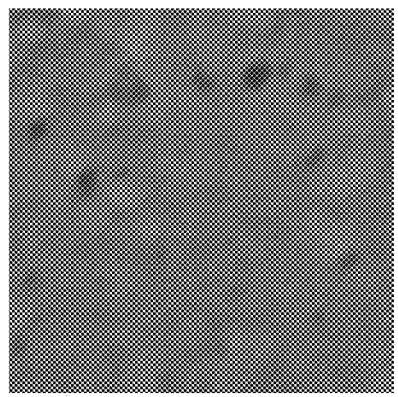
[Figure 12]
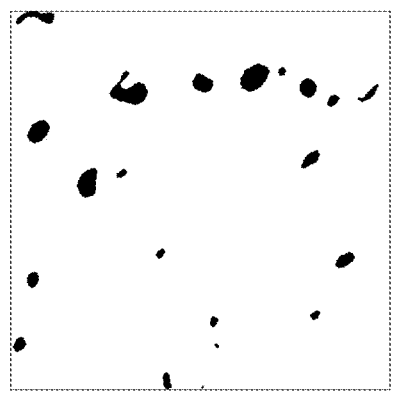

[Figure 13]
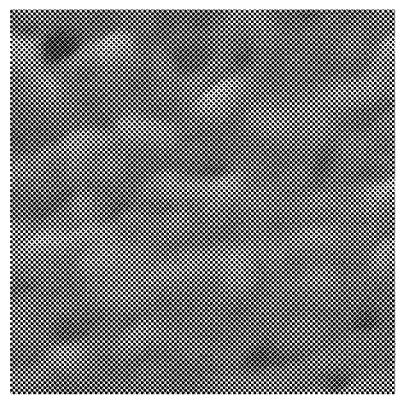
[Figure 14]

POROUS BODY AND PRODUCTION METHOD THEREFOR

CROSS-REFERENCE TO RELATED APPLICATIONS

This application is a U.S. National Phase application of PCT International Application No. PCT/JP2011/071546, filed Sep. 22, 2011, which claims priority to Japanese Patent Application No. 2010-218841, filed Sep. 29, 2010, and Japanese Patent Application No. 2010-289708, filed Dec. 27, 2010, the contents of these applications being incorporated by reference herein in their entireties.

FIELD OF THE INVENTION

The present invention relates to a porous material which has a structure controllable in the order of nanometers to micrometers and comprises a polymethyl methacrylate as a main component, the porous material being advantageously usable as a separation membrane or an adsorbent by utilizing its excellent structural uniformity and high surface porosity; a method of producing the same; a separation membrane composed of the same; and an adsorbent composed of the same.

BACKGROUND OF THE INVENTION

Porous materials are used as separation membranes, adsorbents, fuel cell separators, low-dielectric materials, catalyst carriers and the like. Thereamong, separation membranes are utilized in a wide variety of applications including artificial kidneys and membrane plasma separators in the medical field and water treatment and carbon dioxide separation in the field of environmental energy. Further, since membrane separation process does not involve phase transition from liquid to gas or the like, it is drawing much attention as a separation process which requires smaller energy load as compared to distillation and the like. Moreover, adsorbents are also utilized in a wide variety of fields including medical supplies such as blood purification columns, water treatment, petroleum refinery, deodorization and decolorization.

Polymethyl methacrylate has a high optical transparency; therefore, it can be suitably used in an optical device. On another front, by utilizing its excellent biocompatibility and specific adsorptive properties for proteins, polymethyl methacrylate can also be suitably used as a separation membrane of an artificial kidney comprising a polymethyl methacrylate hollow fiber membrane. Such a separation membrane of polymethyl methacrylate is prepared by utilizing the stereocomplexes of polymethyl methacrylate.

Patent Documents

For example, Patent Document 1 discloses a technology in which a porous material can be obtained by discharging a crude solution, which is prepared by dissolving isotactic polymethyl methacrylate and syndiotactic polymethyl methacrylate in an organic solvent capable of forming stereocomplexes such as dimethyl sulfoxide or dimethylformamide, from a spinneret having an appropriate shape into a poor solvent.

Further, Patent Document 2 discloses a method of membrane formation from a melt polymer which comprises the steps of melting a crystalline polymer such as polyethylene by heating; discharging the resulting polymer from a spinneret; and stretching the discharged polymer. This method of membrane formation from a melt polymer is a method of foaming pores by tearing the amorphous part of a polymer; therefore, it is also called "stretching pore formation method" and is capable of improving the membrane formation rate.

In Patent Document 3, as another method of membrane formation from a melt polymer, there is disclosed a method of preparing a separation membrane which comprises the step of porosifying a polymer alloy, which is obtained by melt-kneading two or more polymers, by partially removing the polymers.

In Non-patent Document 1, it is reported that polymethyl methacrylate forms stereocomplexes during melt-kneading as well and their melting points are not lower than 200° C.
[Patent Document 1] JP S49-37879A
[Patent Document 2] JP S58-163490A
[Patent Document 3] JP 2003-64214A

Non-Patent Document

[Non-patent Document 1] E. L. Feitsma., A. de. Boer., G. Challa., 1975, Polymer Vol. 16, pp. 515-519

SUMMARY OF THE INVENTION

In the method according to Patent Document 1 which is so-called "membrane formation from a polymer solution", the resulting membrane has a high surface porosity as compared to the internal void content, so that the surface of the membrane acts as a bottleneck in permeation of substances, resulting in limited improvement in the efficiency of substance permeation. In this membrane formation from a polymer solution, a reduction in the surface porosity is attributable to the fact that the mobility of polymer molecules in a solution is extremely high as compared to that in a molten polymer. That is, a polymethyl methacrylate solution (crude solution) discharged from a spinneret begins phase separation at an interface between a gas such as air and a liquid such as coagulating liquid. In this case, since the phase separation rapidly progresses in the vicinity of the interface, the polymethyl methacrylate molecules having high mobility aggregate with each other to form a polymethyl methacrylate-rich layer called "skin layer" on the membrane surface. Since this skin layer has a low void content as compared to inside the membrane, the surface porosity of a separation membrane prepared by a method of membrane formation from a polymer solution tends to be lower than the internal void content of the membrane. In order to increase the surface porosity of such membrane, it is also considered to remove the skin layer; however, since the thickness of the skin layer is several microns or less, not only it is technically very difficult to remove only the skin layer, but also it is not realistic to remove the skin layer during a continuous production process such as membrane formation from a polymer solution.

Further, in the method of membrane formation from a melt polymer according to Patent Document 2, the membrane formation rate can be increased up to almost 100 times of that in the membrane formation from a polymer solution. However, the polymers to which the stretching pore formation method can be applied are limited to only some of crystalline polymers such as polyethylene and polypropylene and it is difficult to apply the stretching pore formation method to amorphous polymers such as polymethyl methacrylate. In addition, since pores are formed by tearing, it is difficult to control the diameter of the resulting pores and attain fine and uniform pores.

The other method of membrane formation from a melt polymer according to Patent Document 3 is a method of producing a porous material from an alloy having a fine and uniform continuous structure obtained by spinodal decomposition. This method is characterized in that fine and uniform pores can be formed and that the membrane formation rate is high because of the use of a molten resin. Still, in a melt-kneaded polymer alloy obtained by spinodal decomposition, the selection of polymer alloy system, that is, the combination of polymers is important. In particular, in the preparation of a porous material, it is also required to consider the removal of a polymer when selecting a polymer alloy system. For example, in cases where a polymer is removed by using a solvent, since a solvent which does not dissolve the base polymer of the porous material but selectively dissolves only the polymer to be removed is required, the range of selectable polymer alloy systems is extremely narrow. In Patent Document 3, although several combinations are described as alloy systems of polymethyl methacrylate, there is offered no description with regard to an alloy system from which a polymer can be easily removed.

Furthermore, in Non-patent Document 1, as described in the above, it is reported that polymethyl methacrylate forms stereocomplexes during melt-kneading as well and their melting points are not lower than 200° C. The formation of such stereocomplexes not only makes it difficult to perform melt-kneading, but also partially generates unmelted section, so that there arises a problem that a uniformly melt-kneaded alloy cannot be obtained. It is needless to say that a uniform porous material cannot be obtained from such a non-uniform alloy.

In view of the above-described circumstances, there has been a demand for a highly productive method of producing a polymethyl methacrylate porous material having a high surface porosity.

The present invention provides a porous material comprising a polymethyl methacrylate as a main component in which the pore diameter can be controlled in the order of nanometers to micrometers, which porous material can be advantageously used as a blood component separation membrane of an artificial kidney or the like or as an adsorbent such as a blood purification column by utilizing its high surface porosity and fine and uniform porous structure. Further, the invention provides a method of producing the porous material.

In order to solve the above-described problems, the porous material according to an embodiment of the present invention has the following constitution. That is, the porous material according to an embodiment of the present invention has continuous pores and comprises a polymethyl methacrylate as a main component, wherein the continuous pores have a diameter of 0.001 μm to 500 μm and at least one surface of the porous material has a porosity of 10% to 80%.

In order to solve the above-described problems, the separation membrane according to an embodiment of the present invention has the following constitution. That is, the separation membrane according to the present invention is composed of the above-described porous material.

In order to solve the above-described problems, the adsorbent according to an embodiment of the present invention has the following constitution. That is, the adsorbent according to the present invention is composed of the above-described porous material.

In order to solve the above-described problems, the method of producing a porous material according to an embodiment of the present invention has the following constitution. That is, the method of producing a porous material according to the present invention is a method of producing the above-described porous material which comprises the step of removing, from a polymer alloy molded product obtained from (1) a polymethyl methacrylate and (2) an aliphatic polyester, the (2) aliphatic polyester.

Further, in the porous material according to the present invention, it is preferred that the ratio of isotactic polymethyl methacrylate be less than 10% by weight.

In the porous material according to the present invention, it is preferred that, in a curve of a graph which is obtained by Fourier transformation of a micrograph taken for a square field having a side length of 10 times to 100 times of the pore diameter of the above-described porous material and plots the wavenumber on the abscissa and the strength on the ordinate, the half value width of a peak, (a), and the maximum wavelength of the peak, (b), satisfy the condition, $0<(a)/(b) \leq 1.2$.

In the porous material according to the present invention, it is preferred that, when the amount of a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides is defined as "(A)" and the amount of a repeating unit rendered by methyl methacrylate is defined as "(B)", both of which amounts (A) and (B) are determined from a proton nuclear magnetic resonance spectrum, a value calculated by an equation, $(A)/((A)+(B)) \times 100$, be not less than 0.001.

It is preferred that the porous material according to the present invention comprise the above-described repeating unit other than the one rendered by methyl methacrylate in the form of a copolymer with the polymethyl methacrylate.

It is preferred that the porous material according to the present invention be in the foam of a sheet having a thickness of 1 μm to 5 mm, a hollow fiber having a thickness or 1 μm to 5 mm, a fiber having an outer diameter of 1 μm to 5 mm or particles having a size of 10 μm to 5 mm.

In the separation membrane according to the present invention, it is preferred that a substance to be separated be a biogenic substance.

Further, in the separation membrane according to the present invention, it is preferred that the biogenic substance be blood or a portion thereof.

In the adsorbent according to the present invention, it is preferred that a substance to be adsorbed be a biogenic substance.

Further, in the adsorbent according to the present invention, it is preferred that the biogenic substance be blood or a portion thereof.

It is preferred that the method of producing a porous material according to the present invention comprise the step of removing, from a polymer alloy molded product obtained from (1) a polymethyl methacrylate, (2) an aliphatic polyester and (3) a polymer comprising a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides, the (2) aliphatic polyester.

Further, it is preferred that the method of producing a porous material according to the present invention comprise the step of removing, from a polymer alloy molded product obtained from (1) a polymethyl methacrylate, (2) an aliphatic polyester and (4) a copolymer which comprises a repeating unit rendered by methyl methacrylate and a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides, the (2) aliphatic polyester.

In the method of producing a porous material according to the present invention, it is preferred that a polymethyl methacrylate comprising isotactic polymethyl methacrylate at a ratio of less than 10% by weight be employed.

It is preferred that the method of producing a porous material according to the present invention comprise the step of removing, from a polymer alloy molded product composed of (4) a copolymer which comprises a repeating unit rendered by methyl methacrylate and a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides and (2) an aliphatic polyester, the (2) aliphatic polyester.

In the method of producing a porous material according to the present invention, it is preferred that the (2) aliphatic polyester be a polylactic acid.

In the method of producing a porous material according to the present invention, it is preferred that the (2) aliphatic polyester be removed by hydrolysis.

In the method of producing a porous material according to the present invention, it is preferred that the polymer alloy be obtained by melt-kneading.

In the method of producing a porous material according to the present invention, it is preferred that the polymer alloy be obtained by phase separation induced by spinodal decomposition.

According to an embodiment of the present invention, by performing hydrolysis or the like to remove an aliphatic ester from a polymer alloy obtained from a polymethyl methacrylate and the aliphatic polyester by phase separation induced by spinodal decomposition, a porous material which has a surface porosity of 10% to 80% and comprises continuous pores having a diameter controlled at 0.001 μm to 500 μm can be obtained.

A porous material obtained by the method according to the present invention has a fine and uniform porous structure in which the pore diameter can be controlled in the order of nanometers to micrometers; therefore, the porous material can be advantageously used as a separation membrane, such as a blood component separation membrane of an artificial kidney or the like, or as an adsorbent.

BRIEF DESCRIPTION OF THE DRAWINGS

FIG. 1 is an electron micrograph showing a surface of the porous sheet obtained in Example 8.

FIG. 2 is an image obtained by binarizing the electron micrograph of FIG. 1 using an image analysis software.

FIG. 3 is an electron micrograph showing a surface of the porous sheet obtained in Example 9.

FIG. 4 is an image obtained by binarizing the electron micrograph of FIG. 3 using an image analysis software.

FIG. 5 is an electron micrograph showing a surface of the porous sheet obtained in Example 10.

FIG. 6 is an image obtained by binarizing the electron micrograph of FIG. 5 using an image analysis software.

FIG. 7 is an electron micrograph showing a surface of the porous sheet obtained in Example 11.

FIG. 8 is an image obtained by binarizing the electron micrograph of FIG. 7 using an image analysis software.

FIG. 9 is an electron micrograph showing a surface of the porous sheet obtained in Comparative Example 4.

FIG. 10 is an image obtained by binarizing the electron micrograph of FIG. 9 using an image analysis software.

FIG. 11 is an electron micrograph showing a surface of the porous sheet obtained in Comparative Example 5.

FIG. 12 is an image obtained by binarizing the electron micrograph of FIG. 11 using an image analysis software.

FIG. 13 is an electron micrograph showing a surface of the porous sheet obtained in Comparative Example 6.

FIG. 14 is an image obtained by binarizing the electron micrograph of FIG. 13 using an image analysis software.

DETAILED DESCRIPTION OF EMBODIMENTS OF THE INVENTION

The present invention will now be described in more detail with reference to exemplary embodiments.

The term "porous material" used in the present invention refers to a porous material having continuous pores and such a porous material can be used as a separation membrane by utilizing the continuous pores as sieve. The term "continuous pore" refers to a continuously penetrating pore. In the present invention, a continuous pore is defined as a pore having a length of not less than 5 times of the pore diameter. In a separation membrane, the diameter of the continuous pores, that is, the pore diameter can be set as desired in accordance with the size of the substance to be separated; however, in the porous material according to the present invention, the continuous pores preferably have a diameter of 0.001 μm to 500 μm. When the pore diameter of the continuous pores is smaller than 0.001 μm, not only a high pressure is required for separation, but also there are problems in that, for example, separation requires a long time. On the other hand, when the pore diameter of the continuous pores is larger than 500 μm, there are problems in that, for example, the strength of the porous material is reduced, making it difficult to use the porous material as a separation membrane.

The pore diameter of the continuous pores is preferably 0.002 μm to 100 μm, more preferably 0.003 μm to 50 μm. The method of measuring the pore diameter is as follows. First, a porous material is cooled in liquid nitrogen and fractured by applying thereto a stress. Then, the resulting fracture cross-section is observed under an electron microscope and the resulting electron micrograph is Fourier-transformed. By plotting a graph with the wavenumber on the abscissa and the strength on the ordinate, the maximum wavenumber is determined, and the pore diameter is obtained as the inverse number of the maximum wavenumber. Here, the electron micrograph is sized to be a square having a side length of 5 times to 100 times of the pore diameter.

It is preferred that the continuous pores of the porous material have a uniform pore diameter. Continuous pores having a variety of small and large pore diameters are not preferred since the separation characteristics of the porous material may be deteriorated. The uniformity of pore diameter can be judged based on the peak half width of a curve obtained by plotting the pore diameter on the abscissa and the number of continuous pores having a given pore diameter on the ordinate. That is, in the case of a membrane having a uniform pore diameter, the resulting curve forms a sharp peak, so that the half value width thereof is narrow. On the other hand, in cases where the pore diameter is not uniform, the resulting curve forms a broad peak, so that the half value width thereof is wide. This evaluation of the uniformity of pore diameter based on the peak half width of a graph plotted with the pore diameter on the abscissa and the number of pores on the ordinate can also be done with the inverse number of the pore diameter on the abscissa, that is, wavenumber; therefore, the uniformity of pore diameter is evaluated by using a graph obtained by subjecting an electron micrograph of the porous material to Fourier transformation. Here, as the electron micrograph to be Fourier-transformed, the image used in the above-described measurement of pore diameter is employed. Further, since the peak half width tends to increase with increase in the peak maximum wavenumber, a value of (a)/(b), which is calculated from (a) peak half width and (b) peak maximum wavenumber, is adopted as an index for evaluating the uniformity of pore diameter. In order to allow excellent separation characteristics to be exerted, a higher uniformity of pore diameter is preferred, and the above-described value of (a)/(b) is preferably not larger than 1.2, more preferably not larger than 1.1, still more preferably not larger than 1.0. Further, since a polymer alloy with a more uniform structure is more preferred, the lower limit of (a)/(b) is not particularly restricted. In the present invention, the term "peak half width" means the width of a peak measured at a midpoint (point C) of a line segment connecting a point A, which is the apex of the peak, and a point B, which is the intersection between a straight line drawn parallel to the graph ordinate from the point A and the baseline of the spectrum. Further, the term "the width of a peak" used herein means the width measured on the straight line which is parallel to the baseline and passes through the point C.

In cases where the porous material is used as a separation membrane, the surface porosity is particularly important since it greatly affects the separation characteristics such as permeation of substances. Accordingly, in the porous material according to the present invention, at least one surface preferably has a porosity of 10% to 80%. When the surface porosity is less than 10%, even if the porous material has a high internal void content, there is a problem in that the surface acts as a bottleneck in permeation of substances, so that a desired property cannot be attained. On the other hand, when the surface porosity exceeds 80%, there is a problem in that the strength of the porous material is reduced, so that the structure thereof may not be able to be retained eventually.

The surface porosity is preferably 12% to 70%, more preferably 15% to 60%. In conventional membrane formation from a polymer solution, the surface porosity of the resulting membrane is about 5% and it is difficult to attain a surface porosity of 10% or higher. This is attributable to the fact that, as described in the above, the mobility of polymer molecules in a solution is extremely high as compared to that in a molten polymer. In other words, this is believed to be because, at the gas-liquid interface between a crude solution where phase separation begins and a gas such as air and at the liquid-liquid interface between the crude solution and coagulating liquid, polymethyl methacrylate molecules rapidly precipitate and aggregate to form a polymethyl methacrylate-rich skin phase having a low surface porosity. The present inventors intensively studied such problems in surface porosity and, as a result, successfully obtained a porous material whose surface porosity is 10% to 80% and pore diameter is controlled at 0.001 μm to 500 μm by removing an aliphatic polyester by hydrolysis or the like from a polymer alloy obtained from a polymethyl methacrylate and the aliphatic polyester by phase separation induced by spinodal decomposition. This indicates that, by allowing polymethyl methacrylate to undergo phase separation in a molten state, the mobility of polymethyl methacrylate molecules can be reduced as compared to phase separation in a solution state, so that a skin layer having a low void content is not formed and the surface porosity can thus be attained at 10% or higher.

The term "surface porosity" used herein refers to a ratio of the area of the openings per unit area on at least one surface of the porous material. The surface porosity is measured by analyzing an electron micrograph of a surface of the porous material. That is, the surface porosity can be determined by distinguishing the opening section and non-opening section by binarizing an electron micrograph, which is taken for a square field having a side length of 5 to 100 times of the pore diameter of the porous material surface, by using an image analysis software (such as Scion Image manufactured by Scion Corporation or Matrox Inspector manufactured by Matrox Electronic Systems, Ltd.) and then calculating the area of the opening section. Further, the term "void content" used herein refers to a ratio of the volume of pores per unit volume of the porous material.

In addition to a separation membrane, the porous material can also be used as an adsorbent by utilizing its large surface area. In particular, polymethyl methacrylate has high blood compatibility and is characterized by specifically adsorbing proteins and the like; therefore, the porous material according to the present invention is suitably used in a blood purification column and the like.

The shape of the porous material is not particularly restricted; however, in cases where it is used as a separation membrane, the porous material is preferably in the form of a hollow fiber which can be used in a hollow fiber membrane or in the form of a sheet which can be used as a flat membrane or a coiled membrane. Thereamong, a hollow fiber membrane is particularly preferred since it can provide a large area for a separation membrane. Further, in cases where the porous material is used as an adsorbent, in addition to a sheet form and a hollow fiber form, the porous material is preferably in the form of a fiber which can be used in a knit or nonwoven fabric or in the form of particles such as beads.

In cases where the porous material is used as a separation membrane, when the thickness thereof is excessively small, not only the separation characteristics are deteriorated, but also the strength becomes insufficient and the membrane may thus be damaged in use; therefore, such an excessively small thickness is not preferred. Meanwhile, an excessively thick membrane is also not preferred since separation requires a long time. Accordingly, in cases where the porous material is in the form of a sheet or a hollow fiber, the thickness thereof is preferably 1 μm to 5 mm, more preferably 5 μm to 2 mm, still more preferably 10 μm to 1 mm. On another front, in cases where the porous material is used as an adsorbent, when the size of the fiber or particles is large, the filling factor at the time of loading the fiber or particles into a container becomes low and the adsorption area per unit volume is consequently reduced, which is not preferred. On the other hand, when the size of the fiber or particles is excessively small, for example, the fiber may be broken or the particles may leak into a treatment solution; therefore, such an excessively small size is not preferred. Accordingly, in cases where the porous material is in the form of a fiber, the outer diameter thereof is preferably 1 μm to 5 mm, more preferably 5 μm to 1 mm, still more preferably 10 μm to 500 μm. Further, in cases where the porous material is in the form of particles, the particle size is preferably 10 μm to 5 mm, more preferably 25 μm to 1 mm, still more preferably 50 μm to 500 μm.

As for a preferred method for obtaining a porous material which has the above-described structure and comprises a polymethyl methacrylate as a main component, such a porous material can be obtained by removing an aliphatic polyester by hydrolysis or the like from a polymer alloy obtained from a polymethyl methacrylate, which contains isotactic polymethyl methacrylate at a ratio of not higher than 20% by weight, and the aliphatic polyester by phase separation induced by spinodal decomposition.

In the present invention, the term "porous material comprising a polymethyl methacrylate as a main component" means that not less than 50% by weight of the total weight of the porous material after the removal of aliphatic polyester is constituted by a polymethyl methacrylate or a copolymer containing a repeating unit which renders polymethyl methacrylate in an amount of not less than 50 mol %.

Based on the difference in the configuration of the side chain, there are three types of polymethyl methacrylate: isotactic polymethyl methacrylate, syndiotactic polymethyl methacrylate and atactic polymethyl methacrylate. Thereamong, isotactic polymethyl methacrylate and syndiotactic polymethyl methacrylate, when they are mixed, form a stereocomplex having a melting point of 200° C. or higher. This formation of stereocomplex not only makes it difficult to perform melt-kneading, but also partially generates unmelted section, so that there arises a problem that a uniformly melt-kneaded alloy cannot be obtained. It is needless to say that a uniform porous material cannot be obtained from such a non-uniform alloy. Furthermore, since it is difficult to synthesize isotactic polymethyl methacrylate by ordinary radical polymerization, it is relatively expensive; therefore, unless there is a special reason, the use of isotactic polymethyl methacrylate in a large amount is economically not preferred. Therefore, in the porous material according to the present invention, the ratio of isotactic polymethyl methacrylate in the polymethyl methacrylate is preferably not higher than 10% by weight, more preferably not higher than 9% by weight, still more preferably not higher than 8% by weight.

In the present invention, the ratio of isotactic polymethyl methacrylate in a polymethyl methacrylate is measured using a proton nuclear magnetic resonance spectrum. A porous material is dissolved in deuterated chloroform and tetramethylsilane is added thereto as an internal standard material to measure a proton nuclear magnetic resonance spectrum. Here, in the chemical shifts based on the tetramethylsilane signal, among those three peaks of α-methyl proton signal at 1.33 ppm, 1.21 ppm and 1.10 ppm, the signal at 1.33 ppm is the one originating from isotactic polymethyl methacrylate. Therefore, the ratio of isotactic polymethyl methacrylate in a polymethyl methacrylate can be determined by the following equation.

$$W=X/(X+Y+Z) \times 100$$

Here, W, X, Y and Z each mean as follows.

W: % by weight of isotactic polymethyl methacrylate in a polymethyl methacrylate X: peak area at 1.33 ppm in a proton nuclear magnetic resonance spectrum Y: peak area at 1.21 ppm in a proton nuclear magnetic resonance spectrum Z: peak area at 1.10 ppm in a proton nuclear magnetic resonance spectrum The molecular weight of polymethyl methacrylate is not particularly restricted; however, when it is excessively low, the resulting porous material has a low strength and thus cannot be used as a separation membrane, which is not preferred. On the other hand, when the molecular weight is excessively high, the viscosity of the porous material becomes high when melted, making it difficult to perform membrane formation from a melt polymer. Accordingly, the weight-average molecular weight of polymethyl methacrylate is preferably 10,000 to 2,000,000, more preferably 20,000 to 1,500,000, still more preferably 30,000 to 1,000,000.

The porous material according to the present invention which comprises a polymethyl methacrylate as a main component can be obtained by removing an aliphatic polyester from a polymer alloy (precursor of the porous material) composed of a polymethyl methacrylate and the aliphatic polyester. Therefore, in order to allow fine and uniform continuous pores to be formed, it is required that the structure of the polymer alloy be also fine and uniform. In order to obtain a fine and uniform polymer alloy, alloying based on phase separation induced by spinodal decomposition is effective.

Next, spinodal decomposition is described.

Generally, in polymer alloys composed of two resin components, with respect to their compositions, there are a phase dissolution system where phase dissolution occurs in the entire practical region of glass transition temperature to thermal decomposition temperature; a non-phase dissolution system where, on the contrary, no phase dissolution occurs in the entire region; and a partial phase dissolution system where phase dissolution occurs in a certain region while phase separation state occurs in another region. Further, depending on the condition of the phase separation state, this partial phase dissolution system is classified into a system where phase separation is induced by spinodal decomposition and a system where a phase separation is induced by nuclei production and growth.

The term "phase separation induced by spinodal decomposition" refers to phase separation which occurs in an unstable state represented by the inside of the spinodal curve in a phase diagram plotting two different resin compositions against temperature and the term "phase separation induced by nuclei production and growth" refers to phase separation which occurs in a metastable state represented by the area inside the binodal curve but outside the spinodal curve in the phase diagram.

The term "spinodal curve" refers to a curve in which, when two different resin components are mixed in the relation of the compositions and temperature, the value (∂2ΔGmix/∂ϕ2), which is obtained by twice taking partial derivative of the difference (ΔGmix) between the free energy in phase dissolution state and the total free energy of the two phases in non-phase dissolution state with respect to the concentration (ϕ), is 0. The area inside the spinodal curve represents unstable state, ∂2ΔGmix/∂ϕ2<0, and the area outside the spinodal curve represents a state, ∂2ΔGmix/∂ϕ2>0.

Further, the term "binodal curve" refers to a curve indicating the boundary between the region where the system is in phase dissolution and the region where the system is in phase separation in the relation of the compositions and temperature.

Here, in the present invention, the term "in phase dissolution state" refers to a condition where the components are uniformly mixed at the molecular level, more specifically, a case where neither of the phases containing two different resin components as a main component foams a phase structure of 0.001 μm or thicker. Further, the term "in non-phase dissolution state" refers to a case where the components are not in phase dissolution state, that is, a condition where the phases containing two different resin components as a main component form a phase structure of 0.001 μm or thicker with each other. Whether or not the components undergo phase dissolution can be judged by using, for example, as described in Leszek A. Utracki, 1990, "Polymer Alloys and Blends", Municn: Carl Hanser Publications, pp-64, an electron microscope, a differential scanning calorimeter (DSC) or other various methods.

According to a detailed theory, in spinodal decomposition, when the temperature of a mixed system once allowed to be in uniform phase dissolution state at a temperature in the phase dissolution region is quickly shifted to a temperature of the unstable region, the system swiftly initiate phase separation toward a coexistence composition. In this process, the concentration is consolidated at a certain wavelength and a both-phase continuous structure in which the thus separated phases are continuously and regularly intertwined with each other at a structural period (Λm) is formed. The process subsequent to the formation of both-phase continuous structure where only the concentration difference between the phases increases while the structural period is maintained constant is referred to as "initial stage of spinodal decomposition".

Further, the structural period (Λm) in the above-described initial stage of spinodal decomposition thermodynamically has a relationship represented by the following equation:

$$\Lambda m \sim [|Ts-T|/Ts]^{-1/2}$$

(wherein, Ts represents a temperature on spinodal curve)

Here, in the present invention, the term "both-phase continuous structure" refers to a structure in which both of the mixed resin components each form a continuous phase and the phases are three-dimensionally intertwined with each other. A schematic diagram of this both-phase continuous structure is shown in, for example, "Polymer Alloys: Basics and Applications (2nd edition) (Chapter 10.1)" (edited by The Society of Polymer Science; Tokyo Kagaku Dojin).

In spinodal decomposition, after such initial stage, through an intermediate stage where the wavelength and the concentration difference increase simultaneously and a late-stage where the wavelength increases self-similarly after the concentration difference reaches a coexistence composition, decomposition progresses until two phases are macroscopically separated; however, in the present invention, the structure may be fixed at a stage when a desired structural period is achieved prior to the eventual macroscopic separation of two phases. Further, during the intermediate and late-stages where the wavelength increases, depending on the effects of the composition and interface tension, the continuity of one of the phases may be broken and the above-described both-phase continuous structure may shift to a dispersed structure.

In order to realize spinodal decomposition, after obtaining a resin composed of two or more components in phase dissolution state, it is required to make the resin to be in an unstable state represented by the area inside the spinodal curve.

First, examples of a method for realizing phase dissolution state in a resin composed of two or more components include a solvent casting method in which, for example, components are dissolved in a common solvent and then a film is produced by subjecting the resulting solution to spray-drying, freeze-drying, coagulation in a non-solvent substance or solvent evaporation; and a melt-kneading method in which a partial phase dissolution system is melt-kneaded under a phase dissolution condition. In the present invention, as compared to membrane formation from a polymer solution, phase dissolution by melt-kneading, which is applicable to membrane formation from a melt polymer, a quick membrane formation process, is more preferred.

In order to attain phase dissolution by melt-kneading, an ordinary extruder may be used; however, it is preferred to use a biaxial extruder. The temperature for phase dissolution is required to be set at a condition where the resins of partial phase dissolution system undergo phase dissolution.

Next, when subjecting a polymer alloy attained in phase dissolution state by melt-kneading to spinodal decomposition by shifting the polymer alloy into an unstable condition represented by the area inside the spinodal curve, the temperature for attaining the polymer alloy in an unstable condition and other conditions therefor cannot be generally prescribed since they are variable depending on the combination of the resins; however, the temperature and other conditions can be set by conducting a simple preliminary experiment based on a phase diagram. In the present invention, as described in the above, after controlling the structural period in a specific range in the initial stage, it is preferred that the resulting structure be further developed in the intermediate and subsequent processes to achieve a specific both-phase continuous structure defined in the present invention.

In this initial stage, the method of controlling the structural period in a specific range defined in the present invention is not particularly restricted; however, it is preferred that the polymer alloy be subjected to a heat treatment at a temperature which is not lower than the lowest glass transition temperature of the respective resin components constituting the polymer alloy and shortens the above-described structural period defined thermodynamically. It is noted here that the glass transition temperature can be determined by using a differential scanning calorimeter (DSC) based on the inflection point generated when the resin is heated at a heating rate of 20° C./min from room temperature.

Further, the method of allowing the structure to develop from this initial stage is not particularly restricted; however, normally, a method in which a heat treatment is performed at a temperature which is not lower than the lowest glass transition temperature of the respective resin components constituting a polymer alloy is preferably employed. Moreover, in cases where a polymer alloy in phase dissolution state has a single glass transition temperature or in cases where a polymer alloy, which is in a state where phase decomposition is in progress, has a glass transition temperature in-between the glass transition temperatures of the respective resin components constituting the polymer alloy, it is more preferred that a heat treatment be performed at a temperature which is not lower than the lowest glass transition temperature of the polymer alloy. Furthermore, in cases where a crystalline resin is used as a resin component constituting a polymer alloy, it is preferred that the heat treatment temperature be not lower than the crystal melting temperature of the crystalline resin because structure development can be effectively attained by such a heat treatment. Still further, in order to make it easy to control the above-described structure development, the heat treatment temperature is preferably within ±20° C., more preferably within ±10° C. of the crystal melting point of the crystalline resin. Here, in cases where two or more crystalline resins are used as resin components, the heat treatment temperature is preferably within ±20° C., more preferably within ±10° C., with respect to the highest crystal melting point of the crystalline resins. However, when a heat treatment is performed at the time of sheet stretching, it is preferred that the heat treatment temperature be not higher than the heat crystallization temperature of the crystalline resins. It is noted here that the crystal melting temperature of a crystalline resin can be determined by using a differential scanning calorimeter (DSC) based on the peak temperature of a melting curve obtained by heating the crystalline resin at a heating rate of 20° C./min from room temperature; and that the heat crystallization temperature of a crystallized resin can be determined by using a differential scanning calorimeter (DSC) based on the peak temperature of a crystallization curve obtained by heating a sample, which is prepared by melting the resin at a temperature not lower than its crystal melting point and then rapidly cooled, at a heating rate of 20° C./min from room temperature. Further, examples of a method of fixing a structure produced by spinodal decomposition include a method in which structure fixation is attained for the component of either or both of the separated phases in a short time by rapid cooling or the like.

In the present invention, there are mainly three polymer alloying methods. The first polymer alloying method (polymer alloying method 1) is one which comprises the step of adding, to (1) a polymethyl methacrylate and (2) an aliphatic polyester, (3) a polymer which contains a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides. As the (3) polymer, a polymer which contains a repeating unit rendered by at least one monomer selected from methacrylic acids, methacrylic acid esters composed of a methacrylic acid and a hydrocarbon group having 2 to 16 carbon atoms, α-methylstyrenes and styrenes is particularly preferred.

The second polymer alloying method (polymer alloying method 2) is one which comprises the step of adding, to (1) a polymethyl methacrylate and (2) an aliphatic polyester, (4) a copolymer which contains a repeating unit rendered by methyl methacrylate and a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides. Further, the third polymer alloying method (polymer alloying method 3) is one which comprises the step of adding the above-described (4) copolymer to (2) an aliphatic polyester. As the above-described (4) copolymer, a copolymer which contains a repeating unit rendered by methyl methacrylate and a repeating unit rendered by at least one monomer selected from methacrylic acids, methacrylic acid esters composed of a methacrylic acid and a hydrocarbon group having 2 to 16 carbon atoms, α-methylstyrenes and styrenes is particularly preferred.

Next, the above-described three methods of polymer alloying are described. First, in the polymer alloying method 1, in cases where the (1) polymethyl methacrylate, the (2) aliphatic polyester and the (3) polymer constitute a partial phase dissolution system, spinodal decomposition can be carried out by melt-kneading the components under phase dissolution conditions and then shifting the resulting system to an unstable state represented by the area inside the spinodal curve. Further, in cases where the combination of the (1) polymethyl methacrylate and the (2) aliphatic polyester and the combination of the (1) polymethyl methacrylate and the (3) polymer are in phase dissolution in the temperature range of the melting point to the decomposition temperature and non-compatible polymers are selected as the (2) aliphatic polyester and the (3) polymer or in cases where the combination of the (1) polymethyl methacrylate and the (2) aliphatic polyester and the combination of the (2) aliphatic polyester and the (3) polymer are in phase dissolution in the temperature range of the melting point to the decomposition temperature and non-compatible polymers are selected as the (1) polymethyl methacrylate and the (3) polymer, by melt-kneading the (1) polymethyl methacrylate and the (2) aliphatic polyester to allow them to be in phase dissolution state and then adding the (3) polymer thereto, the compatibility between the (1) polymethyl methacrylate and the (2) aliphatic polyester is reduced, so that spinodal decomposition can be induced. In this case, the size of the both-phase continuous structure of the resulting polymer alloy can be controlled by adjusting the amount of the (3) polymer to be added. In the porous material according to an embodiment of the present invention, by removing the (2) aliphatic polyester from the polymer alloy, a porosity in accordance with the size of the both-phase continuous structure of the polymer alloy can be attained. In other words, the pore diameter of the porous material can be controlled by adjusting the amount of the (3) polymer to be added.

Next, the polymer alloying method 2 is described. In cases where the (1) polymethyl methacrylate, the (2) aliphatic polyester and the (4) copolymer constitute a partial phase dissolution system, spinodal decomposition can be carried out by melt-kneading the components under phase dissolution conditions and then shifting the resulting system to an unstable state represented by the area inside the spinodal curve. Further, in cases where the combination of the (1) polymethyl methacrylate and the (2) aliphatic polyester and the combination of the (1) polymethyl methacrylate and the (4) copolymer are in phase dissolution in the temperature range of the melting point to the decomposition temperature and non-compatible polymers are selected as the (2) aliphatic polyester and the (4) copolymer or in cases where the combination of the (1) polymethyl methacrylate and the (2) aliphatic polyester and the combination of the (2) aliphatic polyester and the (4) copolymer are in phase dissolution in the temperature range of the melting point to the decomposition temperature and non-compatible polymers are selected as the (1) polymethyl methacrylate and the (4) copolymer, for example, when a polylactic acid is selected as the (2) aliphatic polyester and an acrylic acid/methyl methacrylate copolymer (weight ratio: 4/96) is selected as the (4) copolymer, by loading the (1) polymethyl methacrylate and the polylactic acid at a weight ratio of 44/56, melt-kneading them at 200 to 240° C. to attain phase dissolution state and then adding thereto the acrylic acid/methyl methacrylate copolymer, the compatibility between the (1) polymethyl methacrylate and the polylactic acid is reduced, so that spinodal decomposition can be induced. In this case, the size of the both-phase continuous structure of the resulting polymer alloy can be controlled by adjusting the amount of the acrylic acid/methyl methacrylate copolymer to be added. In the porous material according to an embodiment of the present invention, by removing the (2) aliphatic polyester from the polymer alloy, a porosity in accordance with the size of the both-phase continuous structure of the polymer alloy can be attained. In other words, the pore diameter of the porous material can be controlled by adjusting the amount of the acrylic acid/methyl methacrylate copolymer to be added.

Lastly, the polymer alloying method 3 is described. In cases where the (2) aliphatic polyester and the (4) copolymer constitute a partial phase dissolution system, spinodal decomposition can be carried out by melt-kneading the components under phase dissolution conditions and then shifting the resulting system to an unstable state represented by the area inside the spinodal curve. For example, when a polylactic acid is selected as the (2) aliphatic polyester and an α-methylstyrene/methyl methacrylate copolymer (weight ratio: 3/97) is selected as the (4) copolymer, since there is a boundary between the phase dissolution state and the non-phase dissolution state at a temperature of about 240° C. in the resulting phase diagram, the system is in phase dissolution state on the higher temperature side and in non-phase dissolution state on the lower temperature side. By utilizing this change in the phase diagram with the temperature to adjust the melt-kneading temperature, the size of the both-phase continuous structure of the resulting polymer alloy can be controlled. Thus, in the porous material according to an embodiment of the present invention, by removing the (2) aliphatic polyester from the polymer alloy, a porosity in accordance with the size of the both-phase continuous structure of the polymer alloy can be attained. In other words, the pore diameter of the porous material can be controlled by adjusting the melt-kneading temperature.

In the above-described polymer alloying methods, the phase dissolution property can be controlled by adjusting the amount of the (3) polymer or the (4) copolymer. To be more precise, the phase dissolution properties can be controlled by adjusting, in the polymer alloy, the ratio between the amount of the repeating unit rendered by methyl methacrylate and the amount of the repeating unit(s) rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides that are contained in the (3) polymer or the (4) copolymer. This ratio is calculated from the amount of the respective repeating units determined based on the peak areas in a proton nuclear magnetic resonance spectrum. That is, when the amount of a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides is represented by "(A)" and the amount of the repeating unit rendered by methyl methacrylate is represented by "(B)", both of which amounts (A) and (B) are determined from a proton nuclear magnetic resonance spectrum, the above-described ratio is defined as a value calculated by an equation, $(A)/((A)+(B)) \times 100$ (ratio (1)). This ratio (1) is calculated from the amounts of the respective repeating units (A) and (B) that are in moles. In the present invention, the ratio (1) is preferably in the range of 0.001 to 50, more preferably 0.01 to 25, still more preferably 0.1 to 10. When the ratio (1) is less than 0.001, there is a problem in that it becomes difficult to control the phase dissolution properties. On the other hand, when the ratio (1) is greater than 50, there is a problem in that the phase dissolution properties are markedly deteriorated and it thus becomes difficult to maintain a both-phase continuous structure, so that a porous material cannot be obtained.

Further, as a resin to be alloyed with a polymethyl methacrylate in the present invention, considering the compatibility with the polymethyl methacrylate and the removal step for porosification, an aliphatic polyester is preferred, and it is particularly suitable to employ a polylactic acid since it has excellent compatibility with polymethyl methacrylate.

From the standpoint of allowing a continuous structure to be easily formed in spinodal decomposition, the ratio of aliphatic polyester in the resulting polymethyl methacrylate alloy is preferably 5% by weight to 95% by weight, more preferably 10% by weight to 90% by weight, still more preferably 20% by weight to 80% by weight.

When molding a polymer alloy which is the precursor of the porous material according to the present invention, a method in which the polymer alloy is molded simultaneously with or after the formation thereof and prior to the formation of pores and then an aliphatic polyester is removed to form pores is normally employed. The resulting molded product can have an arbitrary shape and, in cases where it is used as a separation membrane or an adsorbent as described in the above, the molded product is preferably in the form of a hollow fiber, a sheet, a fiber or particles.

Examples of a method of molding a polymer alloy include extrusion molding, injection molding, inflation molding and blow molding and, thereamong, extrusion molding is preferred not only because phase dissolution can be attained at the time of extrusion and the resulting polymer alloy, after being ejected, can be spinodally decomposed and heat-treated at the time of sheet stretching, so that the structure can be fixed when the resulting sheet is naturally cooled before being rolled up, but also because the resulting polymer alloy can be molded into the form of a hollow fiber, a sheet or a fiber by utilizing a spinneret of various shapes and subsequently made into a hollow-fiber separation membrane or a flat membrane. Further, injection molding is also preferred because phase dissolution can be attained in the plasticization step performed at the time of injection and the resulting polymer alloy, after being injected, can be spinodally decomposed and a heat treatment and structure fixation thereof can be simultaneously performed inside a metal mold.

Examples of a method of removing an aliphatic polyester from a polymer alloy composed of polymethyl methacrylate and the aliphatic polyester include a method in which an aliphatic polyester is dissolved in a solvent for removal and a method in which an aliphatic polyester is removed by decomposition. Thereamong, a method in which an aliphatic polyester is removed by decomposition is preferred because the aliphatic polyester is removed by being decomposed into low-molecular-weight substances and this removal can thus be performed efficiently even when the pore diameter is small. An aliphatic polyester is preferred also because it can be more easily decomposed and removed by hydrolysis. Since polymethyl methacrylate is highly resistant to alkali, it is suitable that the hydrolysis of aliphatic polyester be performed with an aqueous alkali solution. It is also possible to accelerate the decomposition rate by heating when performing the hydrolysis of aliphatic polyester with an aqueous alkali solution. Furthermore, in the case of continuous production such as the production of a hollow fiber separation membrane, porosification of a polymer alloy can also be performed on-line by passing it through a bath of an aqueous alkali solution. Examples of the alkali include potassium hydroxide, sodium hydroxide, sodium carbonate and potassium carbonate.

The porous material according to the present invention can be advantageously used as a separation membrane by utilizing its fine and uniform continuous pores. Examples of the application of the porous material include, but not limited to, biogenic substance treatment applications in the fields of medicine, biological tools and the like; water treatment applications; food applications such as juice concentration; chemical process applications as an alternative to distillation or the like; gas separation applications; and applications as an electronic information material such as a fuel cell separator. Further, the porous material according to the present invention can also be used as an adsorbent and examples of the application thereof include, but not limited to, in addition to biogenic substance treatment applications in the fields of medicine, biological tools and the like and water treatment applications as in the case of a separation membrane, those applications in deodorization and decolorization. In particular, with regard to the applications in biological substance treatment, the porous material according to the present invention can be suitably used in a blood purification module by utilizing the excellent blood compatibility of polymethyl methacrylate. Here, the term "blood purification module" refers to a module which is used for circulating blood outside the body and has a function of eliminating waste matters and harmful substances from blood by adsorption, filtration, dialysis, diffusion and the like. Examples of such blood purification module include artificial kidneys, membrane plasma separators and toxins adsorption columns. In particular, with utilization of specific adsorptive properties for proteins exhibited by polymethyl methacrylate, it can be expected that unnecessary proteins in blood, which are not removable by dialysis or filtration, are also removed.

In addition to the use as a separation membrane and an adsorbent, the porous material according to the present invention can also be used as a low-dielectric material of a printed circuit board or laminated plate as well as in a cover, sealing member and the like that are used for preventing current leakage of high-frequency components from an inverter or switching power source. Moreover, by utilizing the large surface area, the porous material according to the present invention can also be used as an adsorbent, a catalyst carrier and the like.

The present invention will now be described by way of examples thereof; however, the present invention is not restricted to the following examples.

EXAMPLE

Example 1

A polymethylene methacrylate ("UT300", manufactured by Mitsubishi Rayon Co., Ltd.) and, as an aliphatic polyester, a polylactic acid resin whose D-isomer content is 1.4% and weight-average molecular weight determined by GPC measurement is 260,000 based on PMMA were fed at a weight ratio of 50/50 to a biaxial melt-kneading machine equipped with a T-die adjusted to have a lip clearance of 0.2 mm (HK-25D, manufactured by Parker Corporation, Inc.) to perform membrane formation from the resulting melt polymer at a temperature of 240° C. By controlling the drum temperature at 60° C. and adjusting the roll-up rate, an alloy sheet having a thickness of about 150 μm was prepared.

The thus obtained sheet was cut out into a 10 cm×10 cm square and immersed in 100 mL of a 20%-by-weight aqueous potassium hydroxide solution for 3 days to remove the polylactic acid by hydrolysis, thereby performing porosification of the sheet. Then, after immersing the resulting sheet in 500 mL of ultrapure water for 1 hour and further rinsing it with 200 mL of ultrapure water, the sheet was freeze-dried to obtain a porous sheet comprising the polymethyl methacrylate as a main component.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, the sheet was dissolved in deuterated chloroform and a proton nuclear magnetic resonance spectrum was measured to determine the ratio of isotactic polymethyl methacrylate in polymethyl methacrylate (% by weight). As shown in Table 1, the porous sheet obtained in Example 1 was a membrane having a uniform porous structure and being composed of a porous material comprising a polymethyl methacrylate as a main component.

TABLE 1

|  |  | Example 1 | Example 2 | Comparative Example 1 | Comparative Example 2 |
|---|---|---|---|---|---|
| Preparation |  |  |  |  |  |
| Polymethyl methacrylate [UT300] | (wt %) | 50 | 50 | 30 | 30 |
| Isotactic polymethyl methacrylate | (wt %) | 0 | 0 | 20 | 20 |
| Polylactic acid [4032D] | (wt %) | 50 | 50 | 50 | 50 |
| Melt-kneading temperature | (° C.) | 240 | 200 | 240 | 200 |
| Measurements |  |  |  |  |  |
| Ratio of isotactic polymethyl methacrylate in polymethyl methacrylate | (wt %) | 2.2 | 2.1 | 34.4 | 34.7 |
| Average pore diameter | (μm) | 0.051 | 0.82 | 0.65 | 2.7 |
| (a)/(b) | (—) | 0.71 | 0.69 | 1.38 | 1.43 |

Example 2

A porous sheet comprising a polymethyl methacrylate as a main component was obtained in the same manner as in Example 1, except that the melt-kneading temperature was changed to 200° C.

A cross-section of the thus obtained porous sheet was observed under a transmission electron microscope at a magnification of ×1,000 and a square micrograph of 2 μm×2 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, the sheet was dissolved in deuterated chloroform and a proton nuclear magnetic resonance spectrum was measured to determine the ratio of isotactic polymethyl methacrylate in polymethyl methacrylate (% by weight). As shown in Table 1, the porous sheet obtained in Example 2 was a membrane having a uniform porous structure and being composed of a porous material comprising a polymethyl methacrylate as a main component.

Comparative Example 1

A polymethylene methacrylate ("UT300", manufactured by Mitsubishi Rayon Co., Ltd.), an isotactic polymethyl methacrylate having a weight-average molecular weight of 50,000 which was obtained by Grignard reagent-catalyzed polymerization and, as an aliphatic polyester, a polylactic acid resin whose D-isomer content is 1.4% and weight-average molecular weight determined by GPC measurement is 260,000 based on PMMA were fed at a weight ratio of 30/20/50 to a biaxial melt-kneading machine equipped with a T-die adjusted to have a lip clearance of 0.2 mm (HK-25D, manufactured by Parker Corporation, Inc.) to perform membrane formation from the resulting melt polymer at a temperature of 240° C. By controlling the drum temperature at 60° C. and adjusting the roll-up rate, an alloy sheet having a thickness of about 150 μm was prepared.

The thus obtained sheet was cut out into a 10 cm×10 cm square and immersed in 100 mL of a 20%-by-weight aqueous potassium hydroxide solution for 3 days to remove the polylactic acid by hydrolysis, thereby performing porosification of the sheet. Then, after immersing the resulting sheet in 500 mL of ultrapure water for 1 hour and further rinsing it with 200 mL of ultrapure water, the sheet was freeze-dried to obtain a porous sheet comprising the polymethyl methacrylate as a main component.

A cross-section of the thus obtained porous sheet was observed under a transmission electron microscope at a magnification of ×1,000 and a square micrograph of 18 μm×18 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, the sheet was dissolved in deuterated chloroform and a proton nuclear magnetic resonance spectrum was measured to determine the ratio of isotactic polymethyl methacrylate in polymethyl methacrylate (% by weight). As shown in Table 1, the porous sheet obtained in Comparative Example 1 had a high ratio of isotactic polymethyl methacrylate; therefore, a uniform alloy could not be obtained, so that the resulting membrane was composed of a porous material having non-uniform pore diameter.

Comparative Example 2

A porous sheet comprising a polymethyl methacrylate as a main component was obtained in the same manner as in Comparative Example 1, except that the melt-kneading temperature was changed to 200° C.

A cross-section of the thus obtained porous sheet was observed under a transmission electron microscope at a magnification of ×300 and a square micrograph of 60 μm×60 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, the sheet was dissolved in deuterated chloroform and a proton nuclear magnetic resonance spectrum was measured to determine the ratio of isotactic polymethyl methacrylate in polymethyl methacrylate (% by weight). As shown in Table 1, the porous sheet obtained in Comparative Example 2 had a high ratio of isotactic polymethyl methacrylate; therefore, a uniform alloy could not be obtained, so that the resulting membrane was composed of a porous material having non-uniform pore diameter.

Example 3

A polymethylene methacrylate ("MHF", manufactured by Sumitomo Chemical Co., Ltd.), as an aliphatic polyester, a polylactic acid resin whose D-isomer content is 1.4% and weight-average molecular weight determined by GPC measurement is 140,000 based on PMMA, and a methyl methacrylate/methacrylic acid random copolymer (weight composition ratio: methyl methacrylate/methacrylic acid=96/4) were fed at a weight ratio of 44/55/2 to a biaxial melt-kneading machine equipped with a T-die adjusted to have a lip clearance of 0.2 mm (HK-25D, manufactured by Parker Corporation, Inc.) to perform membrane formation from the resulting melt polymer at a temperature of 240° C. By controlling the drum temperature at 60° C. and adjusting the roll-up rate, an alloy sheet having a thickness of about 150 μm was prepared.

The thus obtained sheet was cut out into a 10 cm×10 cm square and immersed in 100 mL of a 20%-by-weight aqueous potassium hydroxide solution for 3 days to remove the polylactic acid by hydrolysis, thereby performing porosification of the sheet. Then, after immersing the resulting sheet in 500 mL of ultrapure water for 1 hour and further rinsing it with 200 mL of ultrapure water, the sheet was freeze-dried to obtain a porous sheet comprising the polymethyl methacrylate as a main component.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, using (A) the amount of repeating unit rendered by methacrylic acid and (B) the amount of repeating unit rendered by methyl methacrylate which were determined from a proton nuclear magnetic resonance spectrum obtained by dissolving the porous sheet in deuterated chloroform, the value of (A)/((A)+(B))×100 was calculated. As shown in Table 2, the porous sheet obtained in Example 3 was a membrane having a uniform porous structure and being composed of a porous material comprising a polymethyl methacrylate as a main component.

TABLE 2

| Preparation | | Example 3 | Example 4 | Example 5 | Example 6 | Example 7 | Comparative Example 3 |
|---|---|---|---|---|---|---|---|
| Polymethyl methacrylate [MHF] | (wt %) | 44 | 42 | 41 | — | — | 46 |
| Polylactic acid | (wt %) | 55 | 53 | 51 | 55 | 55 | 56 |
| Methyl methacrylate/Methacrylic acid random copolymer | (wt %) | 2 | 5 | 8 | — | — | — |
| Methyl methacrylate/α-methyl styrene random copolymer | (wt %) | — | — | — | 45 | 45 | — |
| Melt-kneading temperature | (° C.) | 240 | 240 | 240 | 240 | 180 | 240 |

TABLE 2-continued

|  |  | Example 3 | Example 4 | Example 5 | Example 6 | Example 7 | Comparative Example 3 |
|---|---|---|---|---|---|---|---|
| Measurements |  |  |  |  |  |  |  |
| (A)/((A) + (B)) * 100 |  | 0.17 | 0.43 | 0.66 | 2.98 | 2.97 | 0 |
| Average pore diameter | (nm) | 2.4 | 2.6 | 2.9 | 3.4 | 8.0 | no continuous pore |
| (a)/(b) | (—) | 0.54 | 0.63 | 0.68 | 0.71 | 0.84 | — |

Example 4

A porous sheet comprising a polymethyl methacrylate as a main component was obtained in the same manner as in Example 3, except that the weight ratio of the polymethyl methacrylate, aliphatic polyester and methyl methacrylate/methacrylic acid random copolymer was changed to 42/53/5.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, using (A) the amount of repeating unit rendered by methacrylic acid and (B) the amount of repeating unit rendered by methyl methacrylate which were determined from a proton nuclear magnetic resonance spectrum obtained by dissolving the sheet in deuterated chloroform, the value of (A)/((A)+(B))×100 was calculated. As shown in Table 2, the porous sheet obtained in Example 4 was a membrane having a uniform porous structure and being composed of a porous material comprising a polymethyl methacrylate as a main component.

Example 5

A porous sheet comprising a polymethyl methacrylate as a main component was obtained in the same manner as in Example 3, except that the weight ratio of the polymethyl methacrylate, aliphatic polyester and methyl methacrylate/methacrylic acid random copolymer was changed to 41/51/8.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, using (A) the amount of repeating unit rendered by methacrylic acid and (B) the amount of repeating unit rendered by methyl methacrylate which were determined from a proton nuclear magnetic resonance spectrum obtained by dissolving the sheet in deuterated chloroform, the value of (A)/((A)+(B))×100 was calculated. As shown in Table 2, the porous sheet obtained in Example 5 was a membrane having a uniform porous structure and being composed of a porous material comprising a polymethyl methacrylate as a main component.

Example 6

A methyl methacrylate/α-methylstyrene random copolymer (weight composition ratio: methyl methacrylate/α-methylstyrene=97/3) and, as an aliphatic polyester, a polylactic acid resin whose D-isomer content is 1.4% and weight-average molecular weight determined by GPC measurement is 140,000 based on PMMA were fed at a weight ratio of 45/55 to a biaxial melt-kneading machine equipped with a T-die adjusted to have a lip clearance of 0.2 mm (HK-25D, manufactured by Parker Corporation, Inc.) to perform membrane formation from the resulting melt polymer at a temperature of 240° C. By controlling the drum temperature at 60° C. and adjusting the roll-up rate, an alloy sheet having a thickness of about 150 μm was prepared.

The thus obtained sheet was cut out into a 10 cm×10 cm square and immersed in 100 mL of a 20%-by-weight aqueous potassium hydroxide solution for 3 days to remove the polylactic acid by hydrolysis, thereby performing porosification of the sheet. Then, after immersing the resulting sheet in 500 mL of ultrapure water for 1 hour and further rinsing it with 200 mL of ultrapure water, the sheet was freeze-dried to obtain a porous sheet comprising the polymethyl methacrylate as a main component.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, using (A) the amount of repeating unit rendered by α-methylstyrene and (B) the amount of repeating unit rendered by methyl methacrylate which were determined from a proton nuclear magnetic resonance spectrum obtained by dissolving the porous sheet in deuterated chloroform, the value of (A)/((A)+(B))×100 was calculated. As shown in Table 2, the porous sheet obtained in Example 6 was a membrane having a uniform porous structure and being composed of a porous material comprising a polymethyl methacrylate as a main component.

Example 7

A porous sheet was obtained in the same manner as in Example 6, except that the temperature of the membrane formation from the melt polymer was changed from 240° C. to 180° C.

A cross-section of the thus obtained porous sheet was observed under a transmission electron microscope at a magnification of ×10,000 and a square micrograph of 3 μm×3 μm was taken. The thus obtained micrograph was Fourier-transformed and the pore diameter and an index of uniformity, (a)/(b), were determined based on the wavenumber and half value width of a peak in a graph plotted with the wavenumber on the abscissa and the strength on the ordinate. Further, using (A) the amount of repeating unit rendered by α-methylstyrene and (B) the amount of repeating unit rendered by methyl methacrylate which were determined from a proton nuclear magnetic resonance spectrum obtained by dissolving the porous sheet in deuterated chloroform, the value of (A)/((A)+(B))×100 was calculated. As shown in Table 2, the porous sheet obtained in Example 7 was a membrane having a uniform porous structure and being composed of a porous material comprising a polymethyl methacrylate as a main component.

Comparative Example 3

A polymethylene methacrylate ("MHF", manufactured by Sumitomo Chemical Co., Ltd.) and, as an aliphatic polyester, a polylactic acid resin whose D-isomer content is 1.4% and weight-average molecular weight determined by GPC measurement is 140,000 based on PMMA were fed at a weight ratio of 44/56 to a biaxial melt-kneading machine equipped with a T-die adjusted to have a lip clearance of 0.2 mm (HK-25D, manufactured by Parker Corporation, Inc.) to perform membrane formation from the resulting melt polymer at a temperature of 240° C. By controlling the drum temperature at 60° C. and adjusting the roll-up rate, an alloy sheet having a thickness of about 150 μm was prepared.

The thus obtained sheet was cut out into a 10 cm×10 cm square and immersed in 100 mL of a 20%-by-weight aqueous potassium hydroxide solution for 3 days. Then, after immersing the resulting sample in 500 mL of ultrapure water for 1 hour and further rinsing it with 200 mL of ultrapure water, the sample was freeze-dried to obtain a sheet.

A cross-section of the thus obtained sheet was observed under a transmission electron microscope; however, no continuous pore was confirmed.

Examples 8 to 11

Preparation of Porous Sheet

A polymethylene methacrylate ("MHF", manufactured by Sumitomo Chemical Co., Ltd.), as an aliphatic polyester, a polylactic acid resin whose D-isomer content is 1.4% and weight-average molecular weight determined by GPC measurement is 140,000 based on PMMA, and a methyl methacrylate/methacrylic acid random copolymer (weight composition ratio: methyl methacrylate/methacrylic acid=96/4) were fed to a biaxial melt-kneading machine equipped with a T-die adjusted to have a lip clearance of 0.2 mm (HK-25D, manufactured by Parker Corporation, Inc.) in accordance with the composition shown in Table 3 to perform membrane formation from the resulting melt polymer at a temperature of 240° C. By controlling the drum temperature at 30° C. and adjusting the roll-up rate, an alloy sheet having a thickness of about 40 μm was prepared.

The thus obtained sheet was cut out into a 10 cm×10 cm square and immersed in 100 mL of a 20%-by-weight aqueous potassium hydroxide solution for 3 days to remove the polylactic acid by hydrolysis, thereby performing porosification of the sheet. Then, after immersing the resulting sheet in 500 mL of ultrapure water for 1 hour and further rinsing it with 200 mL of ultrapure water, the sheet was freeze-dried to obtain a porous sheet comprising the polymethyl methacrylate as a main component.

[Measurement of Surface Porosity]

The surface porosity of the respective porous sheets was observed under a scanning electron microscope (Model S-5500, manufactured by Hitachi, Ltd.) at a magnification of ×200,000. It is noted here that, as a pretreatment for the observation, each observation sample was sputtered with platinum. The thus obtained observation micrograph was trimmed into a square of 250 nm×250 nm and binarized (Threshold) using an image analysis software (Scion Image, manufactured by Scion Corporation). Then, the area calculation (Analyze Particles) was performed to determine the surface porosity. The micrographs used for the observation and the images obtained by binarizing the micrographs using an image analysis software (opening sections are shown in black) are shown in FIGS. 1 to 8.

[Measurement of Pore Diameter and (a)/(b)]

As for the pore diameter, the above-described porous sheets were each fractured in liquid nitrogen and the resulting fracture cross-section was observed under a scanning electron microscope (Model S-5500, manufactured by Hitachi, Ltd.) at a magnification of ×100,000. It is noted here that, as a pretreatment for the observation, each observation sample was sputtered with platinum. The thus obtained observation micrograph was trimmed into a square of 500 nm×500 nm and Fourier-transformed using an image analysis software (Scion Image, manufactured by Scion Corporation). Then, the pore diameter and an index of uniformity, (a)/(b), were determined based on the wavenumber and half value width of a peak in a graph plotted with the wavenumber on the abscissa and the strength on the ordinate. As shown in Table 3, the porous sheets obtained in Examples 8 to 11 were each a membrane having a uniform porous structure and being composed of a porous material comprising a polymethyl methacrylate as a main component.

[Measurement of (A)/((A)+(B))×100]

Further, using (A) the amount of repeating unit rendered by methacrylic acid and (B) the amount of repeating unit rendered by methyl methacrylate which were determined from a proton nuclear magnetic resonance spectrum obtained by dissolving the respective porous sheets in deuterated chloroform, the value of (A)/((A)+(B))×100 was calculated. The results thereof are also shown in Table 3.

[Measurement of Water Permeability]

The respective porous sheets prior to the freeze-drying step were each cut out into a circle of 43 mm in diameter and the permeability of ultrapure water was measured at a pressure of 50 kPa using a stirring-type flat membrane holder (UHP-43K, manufactured by Toyo Roshi Kaisha, Ltd.). The measurement results are also shown in Table 3.

From the results of the above-described measurements, all of the porous sheets obtained in Examples 8 to 11 were found to have a surface porosity of not less than 10% and exhibit high water permeability.

TABLE 3

|  |  | Example 8 | Example 9 | Example 10 | Example 11 | Comparative Example 4 | Comparative Example 5 |
|---|---|---|---|---|---|---|---|
| Preparation |  |  |  |  |  |  |  |
| Polymethyl methacrylate [MHF] | (wt %) | 5 | 15 | 3 | 1.5 | 10 | 5 |
| Polylactic acid | (wt %) | 50 | 70 | 70 | 90 | — | — |

TABLE 3-continued

|  |  | Example 8 | Example 9 | Example 10 | Example 11 | Comparative Example 4 | Comparative Example 5 |
|---|---|---|---|---|---|---|---|
| Methyl methacrylate/Methacrylic acid random copolymer | (wt %) | 45 | 15 | 27 | 8.5 | 10 | 15 |
| Dimethylsulfoxide | (wt %) | — | — | — | — | 80 | 80 |
| Melt-kneading temperature | (° C.) | 240 | 240 | 240 | 240 | — | — |
| Measurements |  |  |  |  |  |  |  |
| Surface porosity | (%) | 17.05 | 15.21 | 25.36 | 54.69 | 1.61 | 2.86 |
| (A)/((A) + (B)) * 100 |  | 3.58 | 2.05 | 3.61 | 3.40 | 1.97 | 3.09 |
| Average pore diameter | (nm) | 7.4 | 5.0 | 10.7 | 12.7 | 6.3 | 8.9 |
| (a)/(b) | (—) | 0.62 | 0.77 | 0.95 | 0.81 | 0.86 | 1.08 |
| Water permeability | (ml/h/m²/kPa) | 402 | 437 | 544 | 715 | 34 | 46 |

Comparative Examples 4 and 5

Preparation of Porous Sheet by Membrane Formation from Polymer Solution

A polymethylene methacrylate ("MHF", manufactured by Sumitomo Chemical Co., Ltd.), a polylactic acid resin whose weight-average molecular weight determined by GPC measurement is 140,000 based on PMMA and a methyl methacrylate/methacrylic acid random copolymer (weight composition ratio: methyl methacrylate/methacrylic acid=96/4) were dissolved with heating in dimethyl sulfoxide in accordance with the composition shown in Table 3. The resulting crude solution was subjected to casting membrane formation on a glass substrate using a casting bar whose clearance had been adjusted. Then, after promptly immersing the thus casted sheet into a water bath along with the glass substrate, the resulting sheet was cut out into a square of 10 cm×10 cm and freeze-dried to obtain a porous sheet.

For each of the thus obtained porous sheets, in the same manner as in the above-described Examples, the surface porosity, the pore diameter, the ratio of (a)/(b), the value of (A)/((A)+(B))×100 and the water permeability were determined. The micrographs used for the observation and the images obtained by binarizing the micrographs using an image analysis software (opening sections are shown in black) are shown in FIGS. 9 to 12. The porous sheets obtained in Examples 4 and 5 were both found to have a surface porosity of not higher than 10% and exhibit low water permeability.

Comparative Example 6

Preparation of Hollow Fiber Membrane by Membrane Formation from Polymer Solution To 79 parts by weight of dimethyl sulfoxide, 3.5 parts by weight of an isotactic polymethyl methacrylate having a weight-average molecular weight of 50,000 which was obtained by Grignard reagent-catalyzed polymerization, 13.7 parts by weight of a syndiotactic polymethyl methacrylate ("SUMIPEX" AK-150, manufactured by Sumitomo Chemical Co., Ltd.) and 3.8 parts by weight of a syndiotactic polymethyl methacrylate ("DIANAL" BR-85, manufactured by Mitsubishi Rayon Co., Ltd.) were added and dissolved with heating. The resulting crude solution was transferred to a spinneret section having a temperature of 110° C. and ejected from a double pipe-type spinneret simultaneously with an injected gas, nitrogen. Here, the distance between the spinneret and a coagulating bath was set to be 190 mm. After being immersed in the coagulating bath composed of 40° C. water, the resultant was washed with water and then rolled up at a rate of 50 m/min to obtain a hollow fiber membrane of 200 µm in inner diameter and 30 µm in thickness. The thus obtained hollow fiber membrane was subsequently freeze-dried.

[Measurement of Surface Porosity]

The thus freeze-dried hollow fiber membrane was half-cut in the longitudinal direction using a single-edged razor blade to expose the inner surface of hollow fiber. The porosity of the inner surface of the hollow fiber was observed under a scanning electron microscope (Model S-5500, manufactured by Hitachi, Ltd.) at a magnification of ×200,000. It is noted here that, as a pretreatment for the observation, the observation sample was sputtered with platinum. The thus obtained observation micrograph was trimmed into a square of 250 nm×250 nm and binarized (Threshold) using an image analysis software (Scion Image, manufactured by Scion Corporation). Then, the area calculation (Analyze Particles) was performed to determine the surface porosity. The porous sheet obtained in Comparative Example 6 was found to have a low surface porosity of not higher than 10%. The micrograph used for the observation and the image obtained by binarizing the micrograph using an image analysis software (opening sections are shown in black) are shown in FIGS. 13 and 14, respectively.

[Measurement of Pore Diameter and (a)/(b)]

As for the pore diameter, the above-described freeze-dried hollow fiber membrane was fractured in liquid nitrogen and the resulting fracture cross-section was observed under a scanning electron microscope (Model S-5500, manufactured by Hitachi, Ltd.) at a magnification of ×100,000. It is noted here that, as a pretreatment for the observation, the observation sample was sputtered with platinum. The thus obtained observation micrograph was trimmed into a square of 500 nm×500 nm and Fourier-transformed using an image analysis software (Scion Image, manufactured by Scion Corporation). Then, the pore diameter and an index of uniformity, (a)/(b), were determined based on the wavenumber and half value width of a peak in a graph plotted with the wavenumber on the abscissa and the strength on the ordinate.

[Measurement of Water Permeability]

A hollow fiber membrane module of 25 cm² in membrane surface area composed of 40 hollow fiber membranes prior to the freeze-drying step was prepared and the water permeability thereof was measured when ultrapure water was filtered through the module at a pressure of 16 kPa from inside to outside of the hollow fibers.

The results of these evaluations are shown in Table 4 altogether.

TABLE 4

|  |  | Comparative Example 6 |
|---|---|---|
| Preparation |  |  |
| Isotactic polymethyl methacrylate | (wt %) | 3.5 |
| "SUMIPEX"AK-150 | (wt %) | 13.7 |
| "DIANAL"BR-85 | (wt %) | 3.8 |
| Dimethylsulfoxide | (wt %) | 79 |
| Measurements |  |  |
| Surface porosity | (%) | 5.31 |
| Average pore diameter | (nm) | 10.2 |
| (a)/(b) | (—) | 0.79 |
| Water permeability | (ml/h/m$^2$/kPa) | 159 |

In a porous material obtained by the production method according to the present invention, the pore diameter can be controlled to be fine and uniform; therefore, as a result, a polymethyl methacrylate porous material which exhibits excellent properties when used as a separation membrane, an adsorbent or the like can be obtained. Furthermore, by taking advantage of having fine and uniform continuous pores, the porous material according to the present invention can be used not only as a low-dielectric material of a printed circuit board and laminated plate, but also in a cover, sealing member and the like that are used for preventing current leakage of high-frequency components from an inverter or switching power source.

The invention claimed is:

1. A porous material, which has continuous pores and comprises a polymethyl methacrylate as a main component, which comprises an isotactic polymethyl methacrylate in the polymethyl methacrylate at a ratio of less than 10% by weight, wherein said continuous pores have a diameter of 0.001 μm to 500 μm and at least one surface of said porous material has a porosity of 10% to 80%.

2. The porous material according to claim 1, wherein, in a curve of a graph which is obtained by Fourier transformation of a micrograph taken for a square field having a side length of 10 times to 100 times of said pore diameter of said porous material and plots the wavenumber on the abscissa and the strength on the ordinate, the half value width of a peak, (a), and the maximum wavenumber of said peak, (b), satisfies a condition, 0<(a)/(b)≤1.2.

3. The porous material according to claim 1, wherein, when the amount of a repeating unit rendered by at least one monomer selected from methacrylic acids, methacrylic acid esters composed of a methacrylic acid and a hydrocarbon group having 2 to 16 carbon atoms, acrylic acids, acrylic acid esters composed of an acrylic acid and a hydrocarbon group having 1 to 16 carbon atoms, α-methylstyrenes, styrenes, maleic anhydrides, maleimides and N-substituted maleimides is defined as "(A)" and the amount of a repeating unit rendered by methyl methacrylate is defined as "(B)", both of which amounts (A) and (B) are determined from a proton nuclear magnetic resonance spectrum, a value calculated by an equation, (A)/((A)+(B))×100, is not less than 0.001.

4. The porous material according to claim 3, which comprises said repeating unit other than the one rendered by methyl methacrylate in the form of a copolymer with said polymethyl methacrylate.

5. The porous material according to claim 1, which is in the form of a sheet having a thickness of 1 μm to 5 mm, a hollow fiber having a thickness or 1 μm to 5 mm, a fiber having an outer diameter of 1 μm to 5 mm or particles having a size of 10 μm to 5 mm.

6. A separation membrane, which is composed of the porous material according to claim 1.

7. The separation membrane according to claim 6, wherein a substance to be separated is a biogenic substance.

8. The separation membrane according to claim 7, wherein said biogenic substance is blood or a portion thereof.

9. An adsorbent, which is composed of the porous material according to claim 1.

10. The adsorbent according to claim 9, wherein a substance to be adsorbed is a biogenic substance.

11. The adsorbent according to claim 10, wherein said biogenic substance is blood or a portion thereof.

* * * * *